July 22, 1952 G. W. ASHLOCK, JR 2,604,131
MACHINE FOR REMOVING PITS FROM FRUIT
Filed April 19, 1950 6 Sheets-Sheet 1

INVENTOR.
George W. Ashlock, Jr.
BY
ATTORNEY

July 22, 1952  G. W. ASHLOCK, JR  2,604,131
MACHINE FOR REMOVING PITS FROM FRUIT
Filed April 19, 1950  6 Sheets-Sheet 2

INVENTOR.
George W. Ashlock, Jr.
BY
Robert N. Bennoff
ATTORNEY

July 22, 1952 G. W. ASHLOCK, JR 2,604,131
MACHINE FOR REMOVING PITS FROM FRUIT
Filed April 19, 1950 6 Sheets-Sheet 3
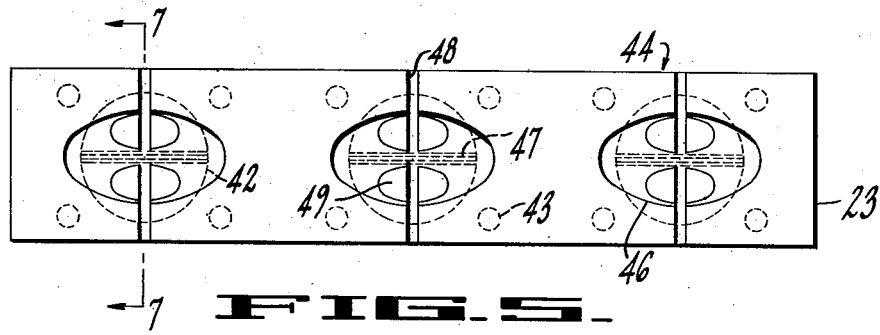
FIG_5_
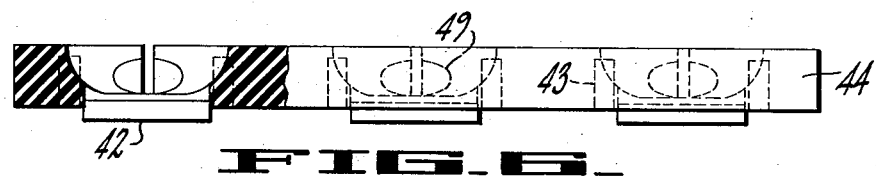
FIG_6_
FIG_7_
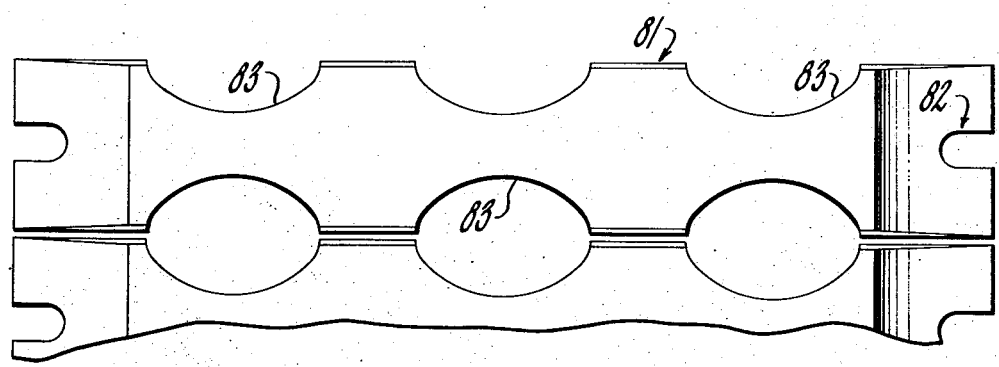
FIG_3_
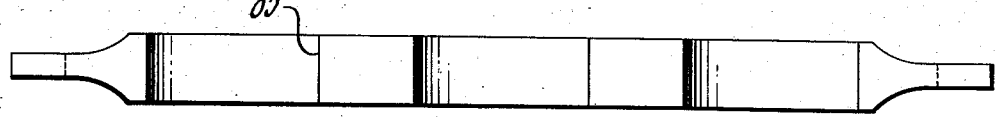
FIG_4_
INVENTOR.
George W. Ashlock, Jr.
BY
ATTORNEY

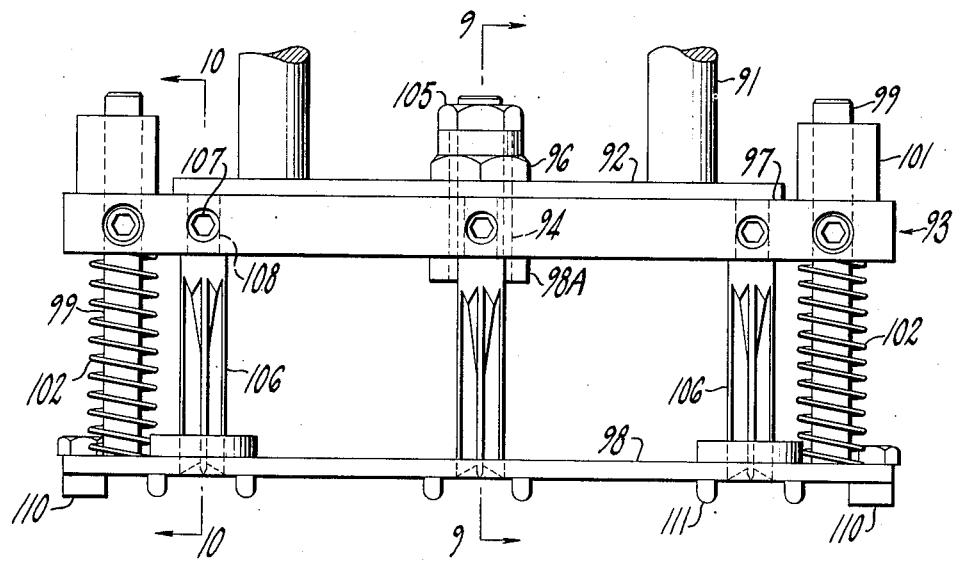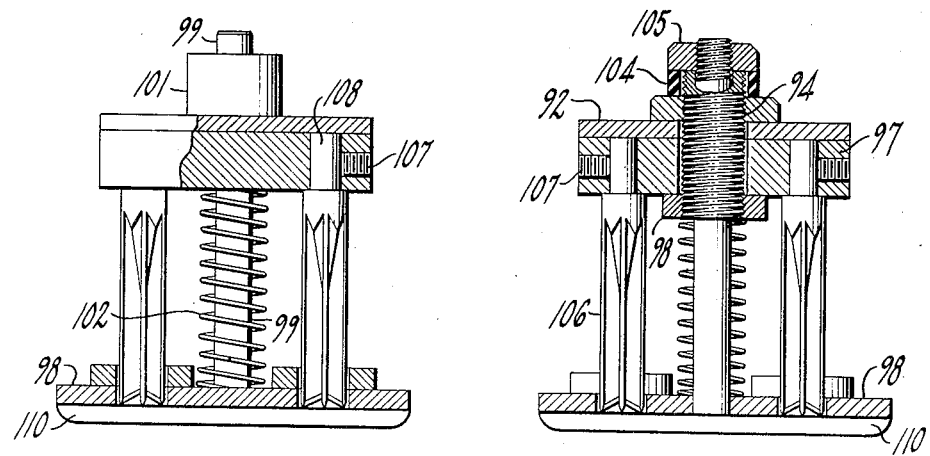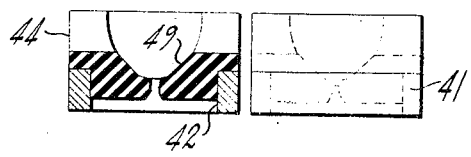

July 22, 1952     G. W. ASHLOCK, JR     2,604,131
MACHINE FOR REMOVING PITS FROM FRUIT Filed April 19, 1950     6 Sheets-Sheet 5

INVENTOR.
George W. Ashlock, Jr.
BY
ATTORNEY

July 22, 1952  G. W. ASHLOCK, JR  2,604,131
MACHINE FOR REMOVING PITS FROM FRUIT
Filed April 19, 1950  6 Sheets-Sheet 6
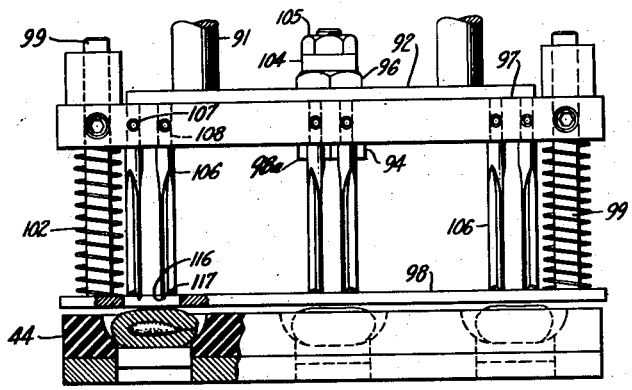
FIG_15_
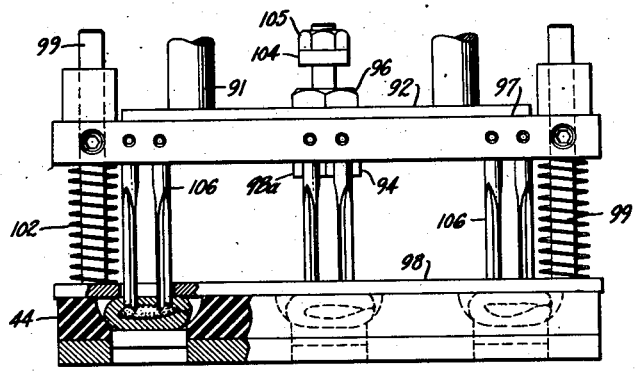
FIG_16_
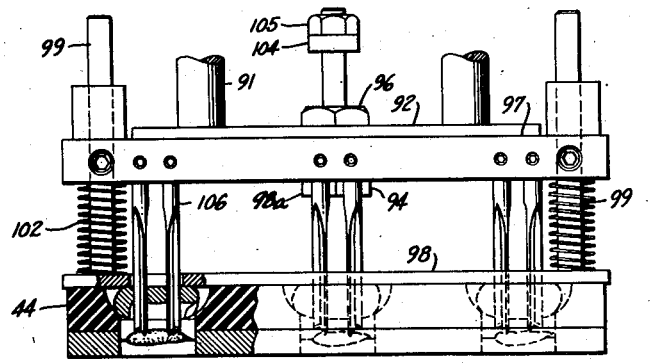
FIG_17_
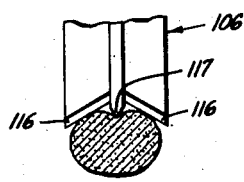
FIG_18_
INVENTOR.
George W. Ashlock, Jr.
BY

UNITED STATES PATENT OFFICE 2,604,131

MACHINE FOR REMOVING PITS FROM FRUIT

George W. Ashlock, Jr., Oakland, Calif.

Application April 19, 1950, Serial No. 156,761

6 Claims. (Cl. 146—17)

This invention relates to a machine for removing the pits from dates, prunes, and like fruit. Dried dates and prunes present very special problems with respect to the removal of the pit or stone for the individual fruits are irregular in shape and, because of their high sugar content, are frequently quite sticky. In addition, it is sometimes advantageous to handle these fruits, particularly prunes, while hot and wet so that the problem of aligning the fruit for a stone removal is even more difficult.

I have found that such a fruit can be successfully pitted if it is first supported along a portion of its side. Thereafter, the fruit stone is ejected through the supported side portion of the fruit. This, I have found, results in a minimum distortion of the fruit for the support provided to the side through which the pit is ejected closes adequately the puncture in the fruit side and the flesh is not exposed. Further, it requires only that the stone be moved a relatively short distance until it is separated from the fruit, thus facilitating the pitting operation and making the removal of the whole stone from the fruit that much more certain.

It is in general the broad object of the present invention to provide a novel machine for the pitting of dried fruits such as dates, prunes and the like.

Another object of the present invention is to provide a method for removing the pit from dates, prunes and the like.

A further object of the present invention is to provide a machine for orienting a dried fruit such as a date or a prune in a predetermined position of alignment as a preliminary to a subsequent processing operation such as a stone removal step.

An additional object of the present invention is to provide a novel feed mechanism for feeding dried fruits such as dates, prunes and the like to a processing mechanism.

An additional and other object is to provide a novel pitting mechanism for fruit such as prunes, dates and the like.

The invention includes other objects and features of advantage, some of which, together with the foregoing, will appear hereinafter wherein the present preferred form of the machine of this invention is disclosed.

Referring to the drawings accompanying and forming a part hereof, Figure 1 is a side elevation with some parts of the machine broken away to illustrate the construction employed.

Figure 3 is a plan view of a portion of the feeding conveyor, while Figure 4 is a side elevation thereof.

Figure 5 is a plan view of a portion of a form of pitting chuck which can be employed.

Figure 6 is a side elevation of the pitting chuck shown in Figure 5.

Figure 7 is a section taken along the line 7—7 in Figure 5.

Figure 8 is a side view of a portion of the pitting mechanism, while Figures 9 and 10 are, respectively, sections taken along the line 9—9 and 10—10 in Figure 8, the latter being shown in position over a chuck.

Figure 11:
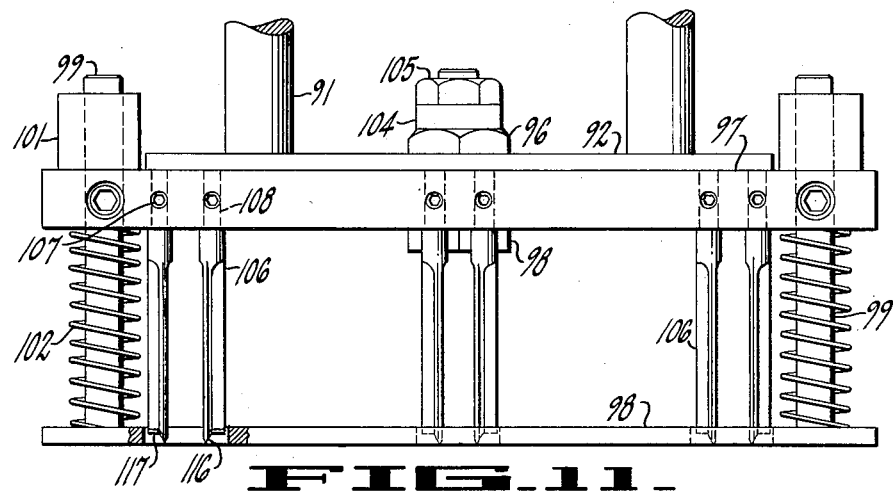

Figure 11 is a side view of a modified form of another pitting mechanism which can be employed.

Figure 12:
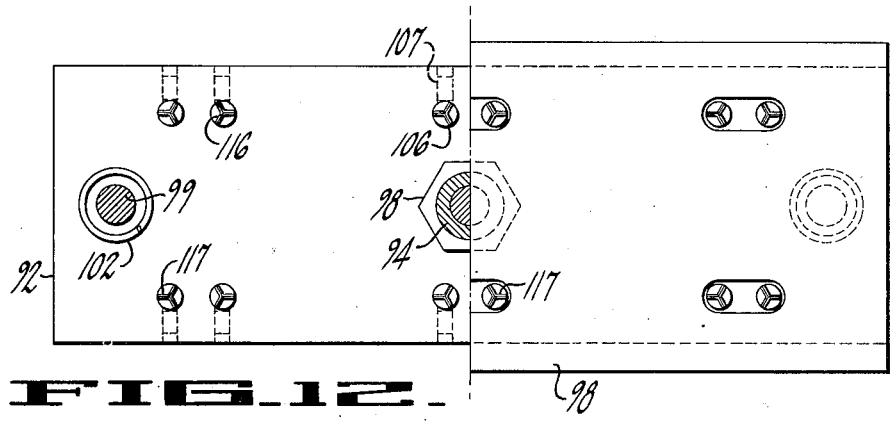

Figure 12 is a bottom view of the pitting mechanism shown in Figure 11, a portion of the bottom plate being omitted from the left-hand side of the figure.

Figure 13 is a fragmentary view of a mechanism for removing pitted fruit from a chuck, a plan view of this mechanism being shown in Figure 14.

Figures 15, 16 and 17 are views of the apparatus illustrating the pitting of a fruit and showing the removal of the stone.

Figure 18 is a schematic view showing the relation of the pitting mechanism to a stone.

Referring to the drawings, the machine includes a frame made up of spaced side plates 11 and 12 supported in a suitable parallel spaced relation and having legs 13 thereon. Shafts 14, 15 and 16 are mounted at opposite corners of the frame, the shafts respectively having pairs of sprockets 17, 18 and 19 thereon about which are trained chains 22 to provide a main fruit conveyor 21. Fruit holders, generally indicated as 23, are extended between the chains, one form thereof being shown in Figures 5, 6 and 7. A subframe 24 is mounted upon side plates 11 and 12 and an electric motor-speed reducer unit, generally indicated at 25, is mounted thereon to drive suitable pitting mechanism generally indicated at 30 and which is more particularly shown in my Patents 2,157,518 and 2,219,832; the prime mover includes a shaft 26 having a sprocket 27 thereon driving a chain 28, this in turn being passed about a sprocket 29 on a shaft 31 in the pitting mechanism (corresponding to shaft 39 in the aforesaid patents). Also mounted on shaft 31 is a sprocket 32, chain 33 being trained about this and about a sprocket 34 on shaft 15 to drive the main fruit conveyor 21 in a timed relation with the pitting mechanism 30. The upper run of conveyor 21 is supported by guide rails 36 provided along the inside of each of plates 11 and 12; the guide rails are preferably provided in several sections, 36a, 36b and 36c, the first and last of which are secured to the inside face of each of side plates while the intermediate section, 36b, is movably supported on the side plates and is vibrated by the vibrating mechanism generally indicated at 37, at about 1800 alternations per minute. Such vibrating mechanism and the support of guide rail section 36b is further described in detail in my Patent 2,250,518 of July 29, 1941, the vibrator being of a mechanical type and including an eccentric operated off a rotating shaft 38 driven by a separate prime mover (not shown).

Each of the fruit holders 23 on the pitting conveyor 21 includes a base plate 41 secured suitably between the chain 22 in the well-known manner. The base plate includes circular apertures 42 therein and four spaced pins 43 provided equidistantly about each circular aperture 42. A rubber cover plate 44 fits snugly upon the pins and includes a circular portion 45 fitting in the aperture 42 and depending below the base plate 41; each plate also includes a plurality of fruit receiving receptacles or cavities 46; in the form illustrated, three receptacles are shown but more or less can be provided, as desired. In that form of the receptacle 46, shown in Figures 5–7, each is of a conoidal shape and includes a narrow slit 47 in the bottom portion thereof parallel to the major axis of the receptacle. A slot 48 extends across each receptacle along the minor axis of the cavity to admit of certain presently described mechanism utilized to remove fruit from the receptacle and which is shown in Figures 13 and 14.

In that cavity shown in Figures 4, 5 and 6, flat abutments 49 are provided immediately adjacent to the intersection of the major and minor axes of each cavity, these being provided on each side of the major axis to form a V section (Figure 7) whereby the fruit is stably supported in the receptacle. Except for the abutments 49, each conoidal cavity is symmetrical about its major axis. The cavity illustrated is that generated by rotation of an ellipse about the major axis, but one can use another conic, e. g. a parabola or a hyperbola. The overall size of the cavity should be sufficient to admit the fruit; to facilitate its retention, a vertical wall 50 is utilized about the upper cavity portion. The ratio of the minor axis to the major axis should be from 0.35 to 0.85, the preferred range being from 0.4 to 0.8 with the preferred ratio being 0.55. The length of each abutment 49 should be approximately that of the average size stone in the fruit. The flat face of each abutment should be of a depth sufficient to provide an adequate guide to the fruit stone; a depth measured along the face of about 0.5 of the minor axis usually sufficing. The two faces should be an angle of from 45° to 100° to one another.

The receptacle shown in Figures 5–7 and previously described is one suited to the orienting and pitting of dried prunes and some sizes of dates. With other fruits other receptacle forms may be employed and the various mechanisms disclosed are not limited to use with only the specific form of receptacle disclosed; one can employ what is in effect a semi-cylindrical cavity. In any case, the cavity has a major and a minor axis at 90° to each other and in the same plane, the cavity being so placed that the pitting knife or knives move to stone the fruit at 90° to each axis, as will appear.

The feed conveyor (Figure 2) includes spaced shafts 61, 62 and 63 mounted at spaced corners on frame plates 64 and 65. The plates are joined by several transverse members 66 and an end wall 67, a side wall 68 and a bottom skid plate 87 are provided to confine the fruit, as will appear. Each of the shafts 61, 62 and 63 includes sprocket pairs 71, 72 and 73 at each end supporting chains 74, shaft 61 being driven by a gear 76 meshing with a gear 77 on shaft 14. Extended transversely between the chains 74 are a plurality of fruit holders generally indicated at 81 comprising longitudinal strip members extended between each of the chains and having apertures 82 therein for attachment by suitable studs to each of the chains.

Each of the carrier members 81 includes a fruit receptacle 83 along an edge, the recess being closed by the edge of the immediately adjacent carrier member 81 to provide a complete enclosure for an article. In the form shown, each carrier member leading edge and trailing edge is provided with a recess, the adjacent recesses cooperating to provide the complete receptacle. Each of plates 64 and 65 includes openings 86 therein through which fruit to be fed is introduced.

Figure 2:
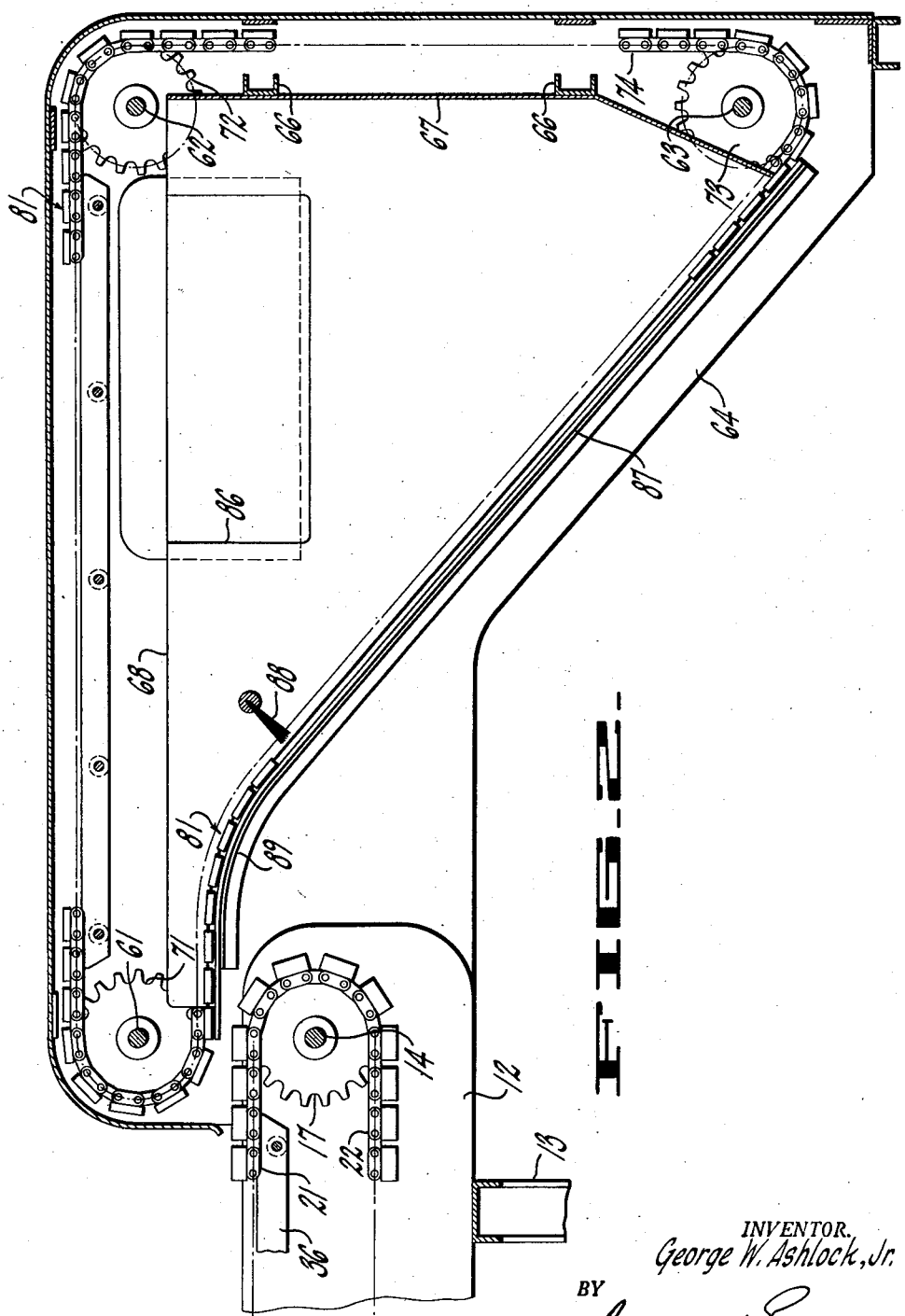
Figure 2 is a section taken through the feeding mechanism and a portion of the processing conveyor.

The chains are movable over a path in which they rise over the bottom supporting plate or skid plate 87 provided between the plates 64 and 65, the fruit falling into each of the various receptacles on the carriers and being conveyed along the skid plate, a brush 88 being positioned transversely between the plates to sweep back any excess fruit which is not within a receptacle between adjacent carriers. The supporting plate 87 includes a horizontal portion 89 from whence the conveyor passes upwardly about sprockets 71. Sprockets 71 are provided immediately adjacent and cooperatively with respect to sprocket 17 whereby, as the fruit carriers 81 pass about sprockets 71, they move apart, as is illustrated in Figure 2, and the fruit therein is released from support of the skid plate and drops into a cooperatively positioned receptacle 46 on carrier 21, the two conveyors being moved in a timed relation to effect a timed feeding and filling of each of the cavities in the carrier 21. It is to be noted that each receptacle in the fruit holders 81 is of a suitable configuration, preferably conoidal, to admit readily the elongated dates and prunes; the receptacles can be provided completely as a recess in an edge of one member, being completed by the adjacent edge of the next adjacent member.

As the fruit is moved along on the processing conveyor, the vibration imparted to such conveyor by the vibrator 37 further assists in alignment of the fruit within the receptacles so that the fruit is aligned by the time it is in position for pitting.

The pitting mechanism is generally disclosed in my aforementioned Patents 2,157,518 and 2,219,832. As appears in Figures 8, 9, 10, 11 and 12, the pitting mechanism includes reciprocally mounted plungers 91 (corresponding to plungers 71 in my Patent 2,291,832) moved in a timed relation to the conveyor 21, the plunger ends having a plate 92 provided therebetween and to which the pitting mechanism generally indicated at 93 is attached, the plunger ends fitting into the plate 97 and a threaded sleeve 94, extending through a hole in the plates 92 and 97 and having nuts 96 and 98a on each end, securing the pitting mechanism 93 on the plungers for reciprocation with these. The pitting mechanism 93 includes an upper plate 97 and a lower plate 98, a guide rod 99 being secured at each end of the lower plate 98 and movable in a guide bushing 101 secured to the upper plate 97, a spring 102 being provided about each guide rod and between the plates whereby the lower plate is urged away from the upper plate. To limit the movement of the lower plate 98 with respect to the upper plate 97, a rod 103 is secured to the lower plate to extend slidably through sleeve 94, a rubber washer 104 being provided between a nut 105 on the end of the rod and nut 96 on the upper end of the sleeve.

Secured in upper plate 97 are a plurality of knives, generally indicated at 106, these being detachably secured by set-screws 107 engaging the ends 108 which are inserted into suitable apertures in the upper plate 97. The knives pass snugly through plate 98, the plate acting as a stripper to remove fruit adhering to each knife; guides 109 are provided about the outer knives.

The lower plate 98 carries adjustable ribs 110 at each end to limit the compressive force applied by the lower plate to fruit on the conveyor 21 so the fruit is not crushed, the ribs engaging the opposite ends of each pair of conveyor strips moved into pitting position. In that form shown in Figures 8–10, secondary ribs 111 are provided transversely of plate 98 to retain fruit in a cavity in position during pitting.

In that form of pitting mechanism shown in Figures 11 and 12, the knives 106 are provided in pairs for cooperative operation with each fruit receptacle, the stripper plate 98 being flat. The knife pairs engage opposite ends of a fruit stone to force the stone through the side of the fruit. Each knife includes three cutting blades thereon at an angle of 120° to each other; two of the blades, those indicated at 116, depend angularly to form a V-shaped receptacle, while the end of the other blade 117 is horizontal, the horizontal blade ends in each pair being parallel and aligning with the major axis of the fruit stone and the first receptacle. The two angular blades 116 thus extend on each side of the stone at an end thereof while the horizonal blade 117 extends along the stone; by using two of these knives, the stone is held firmly and is forced as a body out of the fruit. This is of advantage in fruit having a relatively long stone, as a date, for a single knife tends to tip the stone or else break it in the middle whereby the fruit is not pitted satisfactorily.

Figure 1:
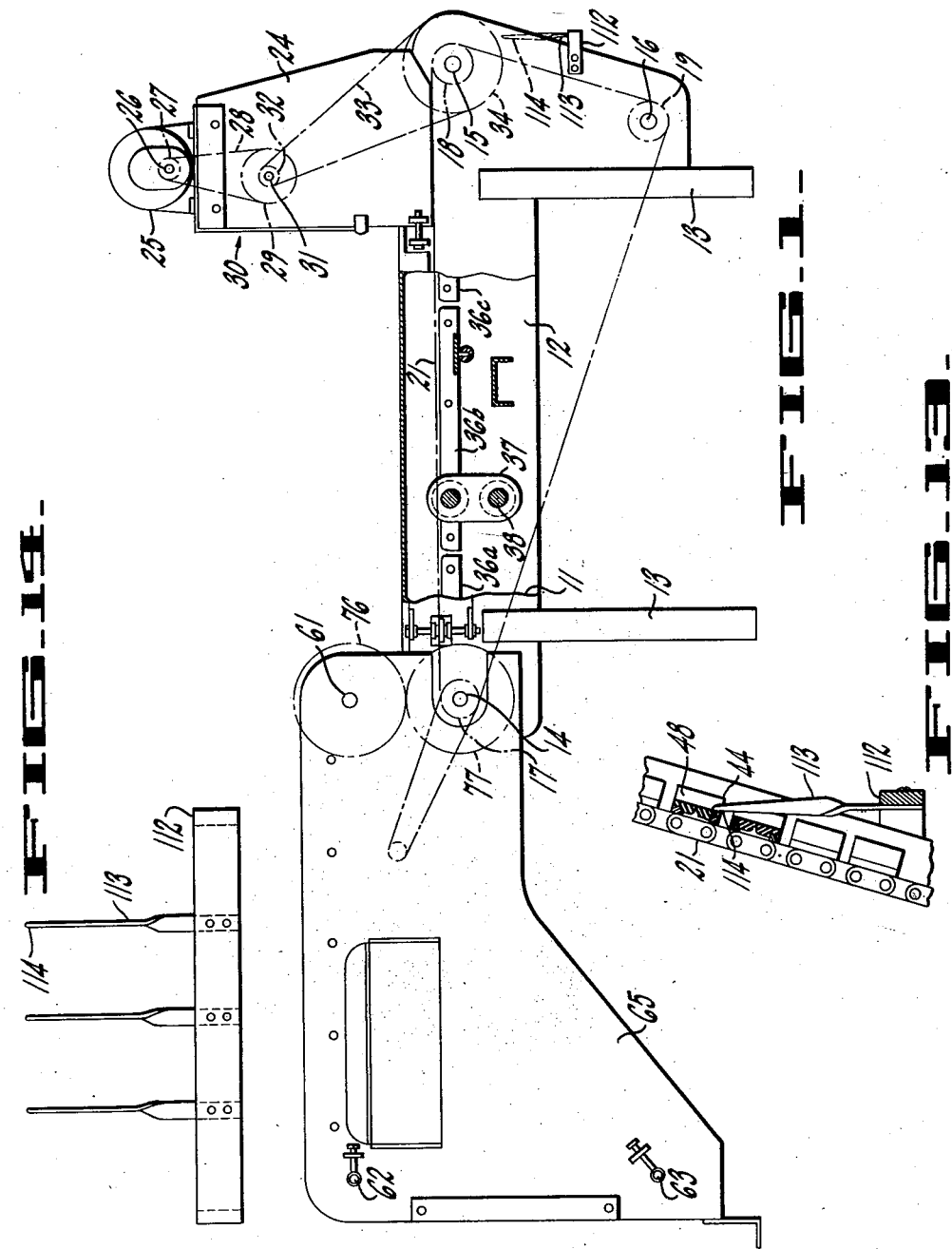

To remove pitted fruit which may become jammed in one of the receptacles (Figures 1, 13 and 14), I provide a plate 112 across the front of the machine with a plurality of upwardly extending fingers 113 thereon, each finger having an end 114 formed to slip into and slide along each slot 48 to engage fruit behind a flat in a receptacle whereby any fruit jammed in the receptacle is removed.

In operation, the feed conveyor and the pitting conveyor each move continuously in a timed relation, while the vibrating mechanism operates continuously to vibrate the intermediate portion of the pitting conveyor. The fruit is fed into the feed hopper from whence it is picked up and delivered, the majority of the fruit being oriented by the time it is in place on the pitting conveyor and immediately following its release by the feed conveyor and deposit on the pitting conveyor. Such fruit as is not oriented is vibrated on the pitting conveyor and is in a desired predetermined position by the time the fruit reaches the pitting station. At the pitting station, the fruit stone is engaged whereby the stone is moved through the side of the fruit and does not turn, twist or break in the fruit. The release of the fruit stone through a small, narrow aperture results in closure of the side of the fruit whereby the fruit appears undamaged and uncut when examined and the flesh is not exposed. Subsequently the fruit drops off the conveyor, or is removed therefrom if it happens to have become jammed.

I claim:

1. A pitter for fruit such as dates, prunes and the like having an elongated stone therein, comprising a rigid support having a planar face thereon and a generally circular aperture therein, a resilient rubber fruit receptacle and means securing said receptacle on said planar face on said metal support, said receptacle having an upper planar face thereon and a cavity in said holder opening into said upper face and being of substantial depth to retain a fruit, said cavity having a major and a minor axis at 90° to each other and being disposed with said axes parallel to said face, a slot in the bottom of said holder extending parallel to said major axis and extending diametrically across the aperture in said metal support, said cavity being symmetrical about said major axis, a fruit engaging abutment on opposite sides of said slot in said cavity of substantial area to provide a V-shaped receptacle in the bottom of said cavity to align the fruit with its stone in a position wherein the longitudinal axis of the stone is parallel to said slot and the stone is superimposed over said slot, a plurality of substantially parallel spaced knives, means for reciprocating said knives simultaneously in the same direction for simultaneously engaging, at 90° to each of said axes, opposite ends of a stone in a fruit in said cavity to force said stone from the fruit and into engagement with said slot in said resilient receptacle to force the stone into and through the slot and so flex the resilient receptacle while opposite sides of the fruit surrounding that area through which the stone is ejected are supported by the resilient receptacle and are forced together and closed by return of the resilient receptacle upon release of the ejected stone through the slot in the receptacle to maintain the natural contour of the fruit; and means for pressing said fruit against said resilient receptacle to retain the fruit in position in said cavity without altering substantially the natural contour of said fruit during removal of the stone and ejection of the stone through said slot.

2. A pitter for fruit such as dates, prunes and the like having an elongated stone therein, comprising a planar metal support having a circular aperture therein, a resilient rubber fruit receptacle, means securing said receptacle on a planar face on said metal support, said receptacle having an upper planar face thereon and a cavity in said holder opening into said upper face, said cavity having a major and a minor axis at 90° to each other and being disposed with said axes parallel to said face, said minor axis being of a length between 0.35 and 0.85 of said major axis, said cavity being symmetrical about said major axis, a slot in said holder extending parallel to said major axis and extending diametrically across said opening, a fruit engaging abutment of substantial area on opposite sides of said slot in said cavity to provide a V-shaped receptacle in the bottom of said cavity to align the fruit with its stone in a position wherein the longitudinal axis of the stone is parallel to said slot and the stone is superimposed over said slot, a plurality of substantially parallel spaced knives, means for reciprocating said knives simultaneously in the same direction for simultaneously engaging, at 90° to each of said axes, opposite ends of a stone in a fruit in said cavity to force said stone from the fruit and into engagement with said slot in said resilient receptacle to force the stone into and through the slot and so flex the resilient receptacle while opposite sides of the fruit surrounding that area through which the stone is ejected are supported by the resilient receptacle and are forced together and closed by return of the resilient receptacle upon release of the ejected stone through the slot in the receptacle to maintain the natural contour of the fruit; and means for pressing said fruit against said resilient receptacle to retain the fruit in position in said cavity without altering substantially the natural contour of said fruit during removal of the stone and ejection of the stone through said slot.

3. A pitter for fruit such as dates, prunes and the like having an elongated stone therein, comprising a planar steel support having a circular aperture therein, a resilient fruit receptacle, means securing said receptacle on a planar face on said metal support, said receptacle having an upper planar face thereon and a cavity in said holder opening into said upper face, said cavity having a major and a minor axis at 90° to each other and being disposed with said axis parallel to said face, said minor axis being of a length between 0.35 and 0.85 of said major axis, said cavity being symmetrical about said major axis, a slot in said holder extending parallel to said major axis and extending diametrically across said opening, a fruit engaging abutment of substantial area on opposite sides of said slot in said cavity and an angle of from about 45° to about 100° to one another to provide a V-shaped receptacle in the bottom of said cavity to align the fruit with its stone in a position wherein the longitudinal axis of the stone is parallel to said slot and the stone is superimposed over said slot, a plurality of substantially parallel spaced knives, means for reciprocating said knives simultaneously in the same direction for simultaneously engaging, at 90° to each of said axes, opposite ends of a stone in a fruit in said cavity to force said stone from the fruit and into engagement with said slot in said resilient receptacle to force the stone into and through the slot and so flex the resilient receptacle while opposite sides of the fruit surrounding that area through which the stone is ejected are supported by the resilient receptacle and are forced together and closed by return of the resilient receptacle upon release of the ejected stone through the slot in the receptacle to maintain the natural contour of the fruit; the engaging ends of the knives being inverted V-shaped to straddle opposite ends of the stone, and means for pressing said fruit against said resilient receptacle to retain the fruit in position in said cavity without altering substantially the natural contour of said fruit during removal of the stone and ejection of the stone through said slot.

4. A fruit holder for fruit such as dates and the like having an elongated stone therein, comprising a rigid support having a planar face thereon and a generally circular aperture therein, a rubber fruit receptacle and means securing said receptacle on said planar face on said metal support, said receptacle having an upper planar face thereon and a cavity in said holder opening into said upper face and being of substantial depth to retain a fruit, said cavity having a major and a minor axis at 90° to each other and being disposed with said axes parallel to said face, a slot in the bottom of said holder extending parallel to said major axis and extending diametrically across the aperture in said metal support, said cavity being symmetrical about said major axis, and a fruit engaging abutment on opposite sides of said slot in said cavity of substantial area to provide a V-shaped receptacle in the bottom of said cavity to align the fruit with its stone in a position wherein the longitudinal axis of the stone is parallel to said slot and the stone is superimposed over said slot.

5. A fruit holder for fruit such as dates and the like having an elongated stone therein, comprising a planar metal support having a circular aperture therein, a rubber fruit receptacle, means securing said receptacle on a planar face on said metal support, said receptacle having an upper planar face thereon and a cavity in said holder opening into said upper face, said cavity having a major and a minor axis at 90° to each other and being disposed with said axes parallel to said face, said minor axis being of a length between 0.35 and 0.85 of said major axis, said cavity being symmetrical about said major axis, a slot in said holder extending parallel to said major axis and extending diametrically across said opening, and a fruit engaging abutment of substantial area on opposite sides of said slot in said cavity to provide a V-shaped receptacle in the bottom of said cavity to align the fruit with its stone in a position wherein the longitudinal axis of the stone is parallel to said slot and the stone is superimposed over said slot.

6. A fruit holder for fruit such as dates and the like having an elongated stone therein, comprising a planar steel support having a circular aperture therein, a rubber fruit receptacle, means securing said receptacle on a planar face on said metal support, said receptacle having an upper planar face thereon and a cavity in said holder opening into said upper face, said cavity having a major and a minor axis at 90° to each other and being disposed with said axis parallel to said face, said minor axis being of a length between 0.35 and 0.85 of said major axis, said cavity being symmetrical about said major axis, a slot in said holder extending parallel to said major axis and extending diametrically across said opening and a fruit engaging abutment of substantial area on opposite sides of said slot in said cavity and an angle of from about 45° to about 100° to one another to provide a V-shaped receptacle in the bottom of said cavity to align the fruit with its stone in a position wherein the longitudinal axis of the stone is parallel to said slot and the stone is superimposed over said slot.

GEORGE W. ASHLOCK, Jr.

REFERENCES CITED

The following references are of record in the file of this patent:

UNITED STATES PATENTS

| Number | Name | Date |
|---|---|---|
| 1,755,872 | Gotelli | Apr. 22, 1930 |
| 1,822,382 | Smith | Sept. 8, 1931 |
| 2,151,943 | Sievers | Mar. 28, 1939 |
| 2,209,305 | Ashlock, Jr. | July 30, 1940 |
| 2,243,530 | Kok | May 27, 1941 |
| 2,308,038 | Ashlock, Jr. | Jan. 12, 1943 |
| 2,314,862 | Ashlock, Jr. | Mar. 30, 1943 |
| 2,406,736 | Ashlock, Jr. | Sept. 3, 1946 |
| 2,407,126 | Ashlock, Jr. | Sept. 3, 1946 |
| 2,428,370 | Kelly | Oct. 7, 1947 |
| 2,528,294 | Ashlock, Jr. | Oct. 31, 1950 |